United States Patent
David

(10) Patent No.: US 12,046,784 B2
(45) Date of Patent: Jul. 23, 2024

(54) METHOD FOR REDUCING THE CARBON CORROSION IN A FUEL CELL STACK, AND MOTOR VEHICLE

(71) Applicant: Bayerische Motoren Werke Aktiengesellschaft, Munich (DE)

(72) Inventor: Frank David, Garching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 65 days.

(21) Appl. No.: 17/295,955

(22) PCT Filed: Oct. 29, 2019

(86) PCT No.: PCT/EP2019/079453
§ 371 (c)(1),
(2) Date: May 21, 2021

(87) PCT Pub. No.: WO2020/114680
PCT Pub. Date: Jun. 11, 2020

(65) Prior Publication Data
US 2022/0006109 A1    Jan. 6, 2022

(30) Foreign Application Priority Data

Dec. 6, 2018    (DE) ..................... 10 2018 131 160.5

(51) Int. Cl.
*H01M 8/04303*    (2016.01)
*H01M 4/92*    (2006.01)
(Continued)

(52) U.S. Cl.
CPC ....... *H01M 8/04679* (2013.01); *H01M 4/926* (2013.01); *H01M 8/04303* (2016.02); *H01M 8/04395* (2013.01); *H01M 8/04552* (2013.01); *H01M 2250/20* (2013.01)

(58) Field of Classification Search
None
See application file for complete search history.

(56) References Cited

U.S. PATENT DOCUMENTS

2008/0318099 A1*  12/2008  Oh ................... H01M 8/04089
                                                                137/511
2009/0123787 A1    5/2009  Shimoi et al.
(Continued)

FOREIGN PATENT DOCUMENTS

| CN | 103259030 A | 8/2013 |
|----|-------------|--------|
| CN | 104937760 A | 9/2015 |

(Continued)

OTHER PUBLICATIONS

International Search Report (PCT/ISA/210) issued in PCT Application No. PCT/EP2019/079453 dated Feb. 14, 2020 with English translation (five (5) pages).
(Continued)

*Primary Examiner* — Lucas J. O'Donnell
(74) *Attorney, Agent, or Firm* — Crowell & Moring LLP

(57) ABSTRACT

A method for reducing the carbon corrosion in a fuel cell stack of a fuel cell system includes the steps of detecting a corrosion value which is representative of the extent of the carbon corrosion probably occurring in the fuel cell stack during an inactive phase of the fuel cell stack, and initiating a protective measure for reducing the carbon corrosion in the fuel cell stack on the basis of the corrosion value.

9 Claims, 1 Drawing Sheet

(51) Int. Cl.
  *H01M 8/0438* (2016.01)
  *H01M 8/04537* (2016.01)
  *H01M 8/04664* (2016.01)

(56) References Cited

U.S. PATENT DOCUMENTS

| | | | |
|---|---|---|---|
| 2011/0143243 | A1 | 6/2011 | Arthur et al. |
| 2011/0244348 | A1 | 10/2011 | Cai et al. |
| 2013/0209907 | A1 | 8/2013 | Goebel |
| 2015/0325872 | A1 | 11/2015 | Kumaraguru et al. |
| 2015/0364777 | A1 | 12/2015 | Haase et al. |
| 2016/0090487 | A1 | 3/2016 | Martorana et al. |
| 2016/0372767 | A1* | 12/2016 | Sinha ............... H01M 8/04303 |
| 2018/0351185 | A1* | 12/2018 | Kim ............... H01M 8/04679 |
| 2019/0334186 | A1 | 10/2019 | Formanski et al. |
| 2020/0091530 | A1* | 3/2020 | Yu ............... H01M 8/04798 |

FOREIGN PATENT DOCUMENTS

| | | | |
|---|---|---|---|
| CN | 105098211 | A | 11/2015 |
| CN | 105408431 | A | 3/2016 |
| DE | 10 2009 036 198 | A1 | 2/2011 |
| DE | 10 2010 053 628 | A1 | 6/2011 |
| DE | 10 2011 015 739 | A1 | 12/2011 |
| DE | 10 2016 203 159 | A1 | 8/2017 |
| DE | 10 2016 217 315 | A1 | 3/2018 |
| DE | 10 2017 200 307 | A1 | 7/2018 |
| EP | 2 725 647 | A | 4/2014 |
| WO | WO-2010035113 | A1 * | 4/2010 ........ H01M 8/04225 |

OTHER PUBLICATIONS

German-language Written Opinion (PCT/ISA/237) issued in PCT Application No. PCT/EP2019/079453 dated Feb. 14, 2020 (six (6) pages).

German-language Search Report issued in German Application No. 10 2018 131 160.5 dated Aug. 8, 2019 with partial English translation (13 pages).

Chinese-language Office Action issued in Chinese Application No. 201980079086.2 dated Apr. 28, 2023 with English translation (13 pages).

* cited by examiner

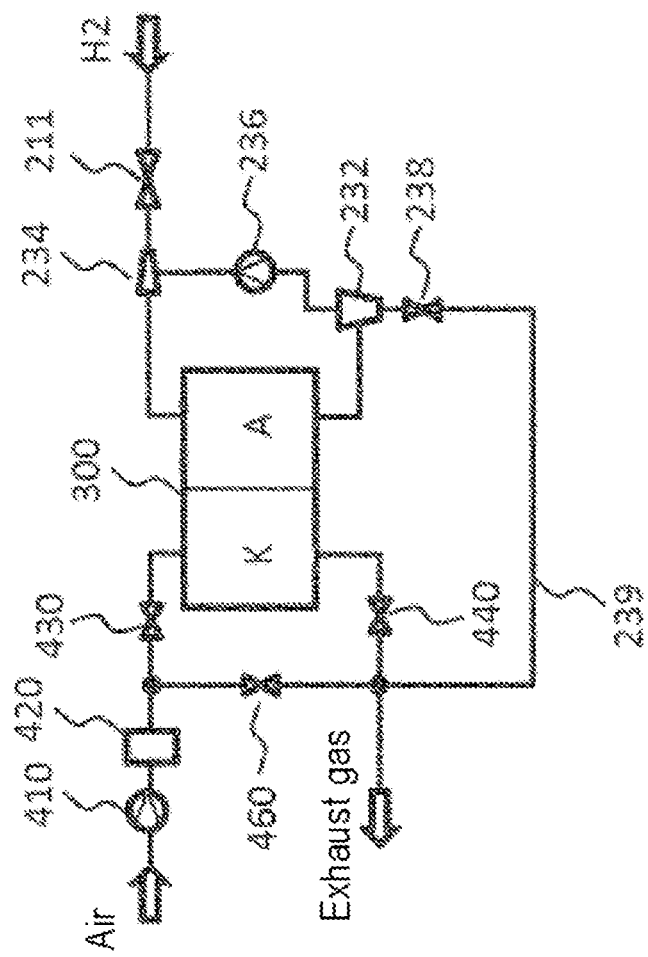

METHOD FOR REDUCING THE CARBON CORROSION IN A FUEL CELL STACK, AND MOTOR VEHICLE

BACKGROUND AND SUMMARY OF THE INVENTION

The disclosed technology relates to a method for reducing the carbon corrosion of a fuel cell stack. The technology disclosed here also relates to a motor vehicle having a fuel cell system which is configured to carry out the method disclosed here.

Fuel cell systems are known per se. A disadvantage of previously known solutions is that, under some circumstances, a so-called oxygen-hydrogen front can form in the fuel cell stack, which can lead to carbon corrosion and thus to a degradation of the fuel cells. Such an oxygen-hydrogen front may arise in particular after a long period of inactivity of the fuel cell system, if the hydrogen has diffused from the anode to the cathode or air has diffused from the cathode to the anode. This phenomenon is known to a person skilled in the art.

It is a preferred object of the technology disclosed here to reduce or eliminate at least one disadvantage of the previously known solutions. In particular, it is a preferred object to at least reduce the degradation of the fuel cells during parked periods. Further preferred objects may arise from the advantageous effects of the technology disclosed here. The object(s) is/are achieved by means of the subject matter of the independent patent claims. The dependent claims represent preferred refinements.

The disclosed technology relates to a method for reducing the carbon corrosion in a fuel cell stack of a fuel cell system, comprising the steps:

- detecting a corrosion value which is representative of the degree of carbon corrosion that is likely to be occurring in the fuel cell stack during an inactive phase of the fuel cell stack; and
- initiating a protective measure in order to reduce the carbon corrosion in the fuel cell stack on the basis of the corrosion value.

The technology disclosed here relates in particular to a method for a fuel cell system having at least one fuel cell and to a fuel cell system configured for the method. The fuel cell system is intended for example for mobile applications such as motor vehicles, in particular for providing energy for at least one drive machine for the propulsion of the motor vehicle. In its simplest form, a fuel cell is an electrochemical energy converter which converts fuel and oxidant into reaction products and, in the process, produces electricity and heat. The fuel cell comprises an anode and a cathode, which are separated by an ion-selective or ion-permeable separator. The anode is supplied with fuel. Preferred fuels are: hydrogen, low-molecular-weight alcohol, biofuels or liquefied natural gas. The cathode is supplied with oxidant. Preferred oxidants are for example air, oxygen and peroxides. The ion-selective separator may for example be in the form of a proton exchange membrane (PEM). Use is preferably made of a cation-selective polymer electrolyte membrane. Materials for such a membrane are for example: Nafion®, Flemion® and Aciplex®.

A fuel cell system comprises, aside from the at least one fuel cell, peripheral system components (BOP components) which can be used during the operation of the at least one fuel cell. In general, multiple fuel cells are combined to form a fuel cell stack or stack.

The fuel cell system comprises an anode subsystem which is formed by the fuel-conducting structural elements of the fuel cell system. An anode subsystem may have at least one pressure vessel, at least one tank shut-off valve, at least one pressure-reducing means, at least one anode feed line which leads to the anode inlet, an anode chamber A in the fuel cell stack, which anode chamber is formed at least in regions by the fuel cell stack, at least one anode exhaust-gas line which leads away from the anode outlet, at least one water separator, at least one anode purge valve, at least one active or passive fuel recirculation conveyor and/or at least one recirculation line, and further elements. The main objective of the anode subsystem is to bring the fuel to and distribute it on the electrochemically active surfaces of the anode chamber and to discharge anode exhaust gas. The anode subsystem may furthermore comprise anode-side stack shut-off valves. The anode-side stack shut-off valves are designed to shut off the anode chamber and possibly further components with respect to a fuel source, in general at least one pressure vessel, and with respect to further components of the anode subsystem.

The fuel cell system comprises a cathode subsystem. The cathode subsystem is formed from the oxidant-conducting structural elements. A cathode subsystem may have at least one oxidant conveyor, at least one cathode feed line which leads to the cathode inlet, at least one cathode exhaust-gas line which leads away from the cathode outlet, a cathode chamber which is formed at least in regions by the fuel cell stack, cathode-side stack shut-off valves, and further elements. The cathode-side stack shut-off valves are configured to shut off the cathode chamber K with respect to further elements of the cathode subsystem.

The main objective of the cathode subsystem is to bring oxidant to and distribute it on the electrochemically active surfaces of the cathode chamber and to discharge oxidant.

The cathode chamber which is gas-tight with respect to the further components of the cathode subsystem (hereinafter referred to for simplicity as "gas-tight cathode chamber" or "cathode chamber") is preferably formed jointly by the fuel cell stack and cathode-side stack shut-off valves arranged in or immediately adjacent to the fuel cell stack. In this context, immediately adjacent to the fuel cell stack means that no further system components of the fuel cell system, or at least no such components which are substantially not closed or closable to the outside in gas-tight fashion, are provided between the respective shut-off valve and the fuel cell stack.

According to the method disclosed here, a corrosion value is detected which is representative of the degree of carbon corrosion that is likely to be occurring in the fuel cell stack during an inactive phase of the fuel cell stack.

An inactive phase of the fuel cell stack is a phase in which the fuel cell stack cannot, or does not need to, provide electrical energy to other electrical consumers or electrical energy store devices. During the inactive phase of the fuel cell stack, at least the cathode-side stack shut-off valves are closed. The anode-side stack shut-off valves are, as it were, expediently likewise closed if it is not presently the intention for fuel to be fed to the anode chamber A.

A phase of non-use of the motor vehicle is however a phase in which it is not the intention for the motor vehicle to be operated (that is to say propelled). In other words, the phase of non-use may for example be a period of time in which the motor vehicle receives no active (drive) command from the user that requires the operation of the fuel cell or of the motor vehicle. This is the case for example when a motor vehicle is parked. In this phase of non-use of the motor vehicle, it is however possible for the control unit of the fuel cell system to be woken up intermittently in order to carry out for example monitoring, protective or comfort functions of the motor vehicle for limited periods of time and in autonomous fashion. For example, the control unit may be woken up in order to feed fuel to the otherwise closed anode chamber during this phase.

The corrosion value is representative of the degree of carbon corrosion that would likely occur if no protective measure were implemented. The corrosion value is thus a predicted value that directly or indirectly describes the degree of carbon corrosion.

For example, the leak-tightness of the cathode chamber K may be used as corrosion value. If exchange processes between the cathode chamber K and the anode chamber R occur during the inactive phase of the fuel cell system, then the pressure in the cathode chamber K generally falls. A pressure difference thus forms between the cathode chamber K and the surroundings. This pressure difference can lead to a replenishing flow of fresh air into the cathode chamber K. The degree of likely carbon corrosion correlates with the quantity of fresh air that flows into the cathode chamber K owing to the pressure difference. The leak-tightness of the cathode chamber, which is determined in particular by the leak-tightness of the cathode-side stack shut-off valves, can thus serve as a corrosion value.

The leak-tightness of the cathode chamber K may expediently be determined during the inactive phase of the fuel cell system, and in particular after the shut-off of the cathode chamber K, by means of the cathode-side stack shut-off valves on the basis of the actual pressure profile of the pressure in the cathode chamber K. For this purpose, it may be provided that the actual pressure profile is compared with a reference pressure profile. The reference pressure profile may for example be a pressure profile implemented previously by means of corresponding tests with the fuel cell stack using an intact stack shut-off valve. On the basis of the deviations of the actual pressure profile from the reference pressure profile, it can be identified whether the leak-tightness of the cathode chamber K corresponds to the specifications or whether a malfunction is present, for example leaking stack shut-off valves.

Alternatively or in addition, the leak-tightness of the anode chamber A can be checked by means of the technology disclosed here. In general, however, use is made of anode-side stack shut-off valves, which are adequately leak-tight.

Preferably, the leak-tightness of the fuel cell stack is checked after the shut-down procedures have been completed and when the control unit of the fuel cell system has not yet been deactivated. Here, the shut-down procedures encompass all method steps that take place between the end of driving operation and the parking of the motor vehicle.

Alternatively or in addition, the leak-tightness of the fuel cell stack may also be checked during an operating phase of the motor vehicle. For example, the leak-tightness may be checked while the electrical power for the motor vehicle is being provided exclusively by at least one electrical energy store. If the electrical power is provided for example by a high-voltage accumulator, then the cathode-side and anode-side stack shut-off valves of the fuel cell stack can be temporarily closed. In this state, it would be possible to infer the leak-tightness of the fuel cell stack on the basis of the pressure profile disclosed here.

Alternatively or in addition, it may be provided that, during the feed of fuel into the anode chamber A of the fuel cell stack while cathode-side stack shut-off valves are closed during the inactive phase of the fuel cell stack, the electrical voltage of at least one fuel cell of the fuel cell stack is detected, and wherein said detected voltage then serves as a corrosion value for the method disclosed here. This feed of fuel serves for compensating the fuel quantity that has previously passed out of the anode chamber A via the ion-permeable separator to the cathode. The voltage of a fuel cell, of multiple fuel cells or of the fuel cell stack as a whole may expediently be detected. As an alternative to the electrical voltage, it would also be possible for other electrical variables to be detected by way of the cell voltage monitoring. If an electrical voltage is detected during the feed of fuel into the anode chamber A, this electrical voltage is attributable to the fact that a voltage potential arises at the fuel-oxidant front, which voltage potential is indicative of presently occurring carbon corrosion. Since fuel is again fed into the otherwise shut-off anode chamber A at certain time intervals during relatively long phases of non-use of a motor vehicle, such a fuel-oxidant front would again cause carbon corrosion after the expiry of a further time interval of the same length. For this reason, the electrical voltage detected during the feed is a suitable corrosion value for the next feed of fuel.

The corrosion value is expediently detected during a phase of non-use of the motor vehicle.

The method disclosed here comprises the step whereby a protective measure for reducing the carbon corrosion is initiated. Here, the protective measure is based on the corrosion value. In other words, a protective measure is implemented taking into consideration the corrosion value. Here, the reduction of the carbon corrosion is, as it were, intended to also encompass the avoidance of such carbon corrosion.

One protective measure provides for example that a time interval until fuel is (next) fed into the anode chamber A of the fuel cell stack while cathode-side stack shut-off valves are closed during the inactive phase of the fuel cell stack is shortened if the corrosion value lies above a corrosion threshold value.

According to the technology disclosed here, it may be provided that, during the inactive phase of the fuel cell system, fuel is repeatedly introduced into the anode chamber in order to compensate the fuel that has migrated out of the anode chamber A. The fuel is thus not fed to the anode chamber A in order to generate electrical energy, but the feed rather serves for avoiding a fuel-oxidant front.

The time intervals between the repeating fuel feed operations may, in one refinement, be fixed time intervals. In a preferred refinement, these time intervals may be variable. It may expediently be provided that the time interval is shortened if the corrosion value suggests that, without a protective measure, carbon corrosion would occur to a non-tolerable degree. Additionally, in one refinement, it may be provided that the time interval is lengthened (again) if previously detected corrosion values indicate no or only very little carbon corrosion for the future. An advantage of such a refinement is that the time intervals between the fuel feed operations during the inactive phase can be improved. Here, a conflict of aims can be resolved: on the one hand, the longest time intervals possible are sought in order that the controller of the fuel cell system has to be activated as little as possible. On the other hand, the time intervals should be selected to be so short that the formation of a fuel-oxidant front can be completely or largely avoided.

The corrosion threshold value is generally selected such that no carbon corrosion occurs or carbon corrosion occurs to a tolerable degree if said corrosion threshold value is not overshot. The corrosion threshold value may for example be ascertained in series of tests during the development of the fuel cell system.

Furthermore, a deactivation corrosion threshold value may be provided. The deactivation corrosion threshold value may be representative of a degree of carbon corrosion which is greater than the degree of carbon corrosion that occurs if the corrosion threshold value is overshot. For example, the interval corrosion threshold value may be selected such that, in any case, a non-tolerable malfunction is present. This would be the case for example if it must be assumed that intense carbon corrosion would occur in any case. If the corrosion threshold value is higher than the deactivation corrosion threshold value, further or other protective measures may be implemented. For example, a warning notification may be output and/or the anode-side stack shut-off valve may be permanently closed without allowing further fuel feed operations or autonomous operation of the fuel cell system.

Alternatively or in addition to the time intervals between two fuel feed operations, the time interval between the completion of the shut-down procedures and the first fuel feed operation in the phase of non-use of the motor vehicle can likewise be varied as disclosed in conjunction with the other time intervals.

In other words, the technology disclosed here relates to method for reducing or preventing degradation. According to a first aspect of the technology disclosed here, the pressure profile of anode and/or cathode after the shut-down of the fuel cell stack, with the stack shut-off valves closed, is detected. In particular, the pressure profile can be observed after the shut-down of the system, for example after the shut-down and before the control units enter a sleep state and/or by renewed wake-up/measurement after a fixed time interval. The leak-tightness of the cathode valves can be quantified with sufficient accuracy by interpretation of the pressure profile. The method disclosed here for detecting the leak-tightness of the cathode chamber necessitates a closure of the cathode valves in order to estimate the leak-tightness thereof. This may expediently be performed after deactivation of the fuel cell system. Alternatively or in addition, it is conceivable that, also during the operation of the motor vehicle, the cathode valves are closed and the leak-tightness of the cathode chamber is detected, for example if no power needs to be drawn from the fuel cell stack over a relatively long period of time or a journey segment in which the electrical energy is provided exclusively by a high-voltage battery (for example in queueing traffic). In the case of such a detection during travel with the motor vehicle, it is expediently the case that not all shut-down processes are performed that are otherwise performed during the parking of the motor vehicle. It is sufficient if the cathode valves are supplied with fuel and the anode is not supplied with fuel. In the case of a leak-tightness check during travel, it is thus the case that the fuel cell stack is not providing any electrical power to other electrical consumers or energy store devices. In order to produce power with the fuel cell stack again, it is merely necessary for the valves to be reopened.

On the basis of the detected leak-tightness, it is possible to calculate an interval for when, in order to avoid/reduce carbon corrosion, a renewed feed of hydrogen is necessary in order that no excessive amount of oxygen accumulates in the anode chamber.

The technology disclosed here furthermore comprises a voltage measurement of individual cells or of the fuel cell stack. Prior to the start of the fuel cell system, the anode is supplied with hydrogen. Here, if a hydrogen-oxygen front arises, this front leads to an increase of the individual cell voltages. This increase of the cell voltages can be used as an indicator to modify the time interval for the refilling of the anode with fuel. For example, the time interval may be shortened if the predefined time interval, or time interval determined in advance on the basis of a prediction (for example the method disclosed here using the corrosion threshold value), for the refilling of the anode was too long, for example owing to a damaged cathode-side shut-off valve.

BRIEF DESCRIPTION OF THE DRAWING

FIG. 1 shows an embodiment of a fuel cell system designed to carry out the present invention.

DETAILED DESCRIPTION OF THE DRAWING

The fuel cell stack 300 in FIG. 1 is in this case schematically divided into two parts, wherein one part jointly forms the anode chamber A and a second part jointly forms the cathode chamber K. The fuel cell stack 300 is illustrated in highly simplified form here. In reality, the fuel cell stack 300 generally comprises several hundred individual cells which each have a cathode and an anode that are separated by an ion-permeable separator.

The cathode subsystem comprises:
- an oxidant conveyor 410 which draws in and compresses the oxidant (in this case air);
- downstream of the oxidant conveyor 410, a charge-air cooler 420 which cools the compressed oxidant;
- a bypass 460 which branches off upstream of the fuel cell stack 300 and opens into the exhaust-gas line downstream of the fuel cell stack;
- a first cathode-side stack shut-off valve 430 or cathode shut-off valve, which is arranged upstream of the fuel cell stack 300; and
- a second cathode-side stack shut-off valve 440, which is arranged downstream of the fuel cell stack 300.

The cathode-side stack shut-off valves 430, 440 are arranged immediately adjacent to the fuel cell stack 300. Here, an anode purge line 239 opens in between the first stack shut-off valve 430 and the fuel cell stack 300, which anode purge line in this case begins at an anode purge valve or purge valve 238.

The anode purge valve 238 is formed here at or adjacent to the water separator 232. The anode purge valve 238 may also be referred to as anode-side stack shut-off valve 238 downstream of the fuel cell stack 300.

Here, the anode subsystem furthermore comprises inter alia:
- at least one fuel source (illustrated here by "H2");
- at least one anode-side (first) stack shut-off valve 211, which is arranged upstream of the fuel cell stack 300 and which is designed to shut off the fluidic connection between the fuel source and the rest of the anode subsystem;
- at least one ejector 234 which is designed to introduce recirculated gas into the anode feed line; and
- at least one fuel recirculation conveyor which is arranged in the recirculation line and conveys the gas for recirculation.

It is likewise possible, in particular in an embodiment without recirculation, for the anode-side stack shut-off valve 211 to be provided immediately adjacent to the anode inlet of the fuel cell stack 300.

The cathode-side stack shut-off valves 430, 440 form, together with a subregion of the fuel cell 300, a cathode chamber K which is separated in gas-tight fashion with respect to the rest of the components of the cathode subsystem. Likewise, the anode-side stack shut-off valves 211, 238 in this case form an anode chamber A together with a subregion of the fuel cell 300, which may be closed off with respect to other regions of the anode subsystem and/or of the cathode subsystem.

Not illustrated is the control unit for carrying out the method disclosed here. It is in particular a control unit which may be configured to carry out the method disclosed here even during a phase of non-use of the motor vehicle.

The above description of the present invention serves merely for illustrative purposes and not for the purposes of limiting the invention. In the context of the invention, various alterations and modifications are possible without departing from the scope of the invention and its equivalents.

What is claimed is:

1. A method for reducing the carbon corrosion in a fuel cell stack of a fuel cell system, comprising the acts of:
    detecting a corrosion value in the fuel cell stack representative of a degree of carbon corrosion in the fuel cell stack during an inactive phase of the fuel cell stack;
    comparing the detected corrosion value to a value corresponding to a predetermined carbon corrosion threshold value; and
    initiating a protective measure to reduce the carbon corrosion in the fuel cell stack if the detected corrosion value exceeds the corrosion threshold value, wherein
        the act of detecting the corrosion value includes detecting a leak-tightness of a cathode chamber of the fuel cell stack which corresponds to the detected corrosion value, and
        the leak-tightness of the cathode chamber is detected on the basis of a pressure decrease profile of the cathode chamber after shutting-off of the cathode chamber.

2. The method according to claim 1, wherein
in the protective measure, a time interval until fuel is initially fed into an anode chamber of the fuel cell stack during an inactive phase of the fuel cell stack is shortened if the detected corrosion value exceeds the corrosion threshold value.

3. The method according to claim 2, wherein
further feed of fuel during the inactive phase of the fuel cell system is prevented if the detected corrosion value exceeds a predetermined deactivation corrosion threshold value.

4. A method for reducing the carbon corrosion in a fuel cell stack of a fuel cell system, comprising the acts of:
    detecting a corrosion value in the fuel cell stack representative of a degree of carbon corrosion in the fuel cell stack during an inactive phase of the fuel cell stack;
    comparing the detected corrosion value to a value corresponding to a predetermined carbon corrosion threshold value; and
    initiating a protective measure to reduce the carbon corrosion in the fuel cell stack if the detected corrosion value exceeds the corrosion threshold value, wherein
        the act of detecting the corrosion value includes
            detecting, while cathode-side stack shut-off valves that are disposed immediately adjacent to the fuel cell stack with no fuel cell components disposed therebetween are closed, an electrical voltage of at least one fuel cell of the fuel cell stack during feed of fuel into an anode chamber of the fuel cell stack during an inactive phase of the fuel cell stack, and
            the detected voltage corresponds to the detected corrosion value.

5. The method according to claim 1, wherein
the fuel cell stack is provided in a motor vehicle, and
the detected corrosion value is detected during a phase of non-use of the motor vehicle.

6. The method according to claim 1, wherein
the fuel cell stack is provided in a motor vehicle, and
a leak-tightness of the fuel cell stack is checked after shut-down procedures of the motor vehicle have been completed and before a control unit of the fuel cell system is deactivated.

7. The method according to claim 1, wherein
the fuel cell stack is provided in a motor vehicle, and
a leak-tightness of the fuel cell stack is checked while electrical power for the motor vehicle is being provided exclusively by at least one electrical energy store.

8. A motor vehicle, comprising:
a fuel cell system having at least one fuel cell stack, wherein the fuel cell system is configured to
    detect a corrosion value in the fuel cell stack representative of a degree of carbon corrosion in the fuel cell stack during an inactive phase of the fuel cell stack;
    compare the detected corrosion value to a value corresponding to a predetermined carbon corrosion threshold value; and
    initiate a protective measure to reduce the carbon corrosion in the fuel cell stack if the detected corrosion value exceeds the corrosion threshold value, wherein
        the act of detecting the corrosion value includes detecting a leak-tightness of a cathode chamber of the fuel cell stack which corresponds to the detected corrosion value, and
        the leak-tightness of the cathode chamber is detected on the basis of a pressure decrease profile of the cathode chamber after shutting-off of the cathode chamber.

9. A motor vehicle, comprising:
a fuel cell system having at least one fuel cell stack, wherein the fuel cell system is configured to
    detect a corrosion value in the fuel cell stack representative of a degree of carbon corrosion in the fuel cell stack during an inactive phase of the fuel cell stack;
    compare the detected corrosion value to a value corresponding to a predetermined carbon corrosion threshold value; and
    initiate a protective measure to reduce the carbon corrosion in the fuel cell stack if the detected corrosion value exceeds the corrosion threshold value, wherein
        the act of detecting the corrosion value includes detecting, while cathode-side stack shut-off valves that are disposed immediately adjacent to the fuel cell stack with no fuel cell components disposed therebetween are closed, an electrical voltage of at least one fuel cell of the fuel cell stack during feed of fuel into an anode chamber of the fuel cell stack during an inactive phase of the fuel cell stack, and
        the detected voltage corresponds to the detected corrosion value.

* * * * *